United States Patent
Appleton

(10) Patent No.: US 9,528,428 B2
(45) Date of Patent: Dec. 27, 2016

(54) COOLING SYSTEM FOR CHARGE AIR COOLER

(71) Applicant: Deere & Company, Moline, IL (US)

(72) Inventor: Andy B. Appleton, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 141 days.

(21) Appl. No.: 14/513,941

(22) Filed: Oct. 14, 2014

(65) Prior Publication Data

US 2016/0102602 A1  Apr. 14, 2016

(51) Int. Cl.
| | |
|---|---|
| F02B 29/04 | (2006.01) |
| F02B 61/00 | (2006.01) |
| F01P 5/02 | (2006.01) |
| F01P 5/10 | (2006.01) |
| F01P 3/18 | (2006.01) |

(52) U.S. Cl.
CPC .............. *F02B 29/0475* (2013.01); *F01P 3/18* (2013.01); *F01P 5/02* (2013.01); *F01P 5/10* (2013.01); *F02B 61/00* (2013.01); *F01P 2003/187* (2013.01); *F02B 29/0437* (2013.01); *F02B 29/0462* (2013.01)

(58) Field of Classification Search
CPC .............. F02B 29/0475; F02B 29/0437; F02B 29/0462; F02B 29/0412; F02B 61/00; F01P 5/02; F01P 5/10; F01P 3/12; F01P 3/18; F01P 2003/187; F01P 7/14; F01P 7/16
USPC ..... 123/542, 563, 41.29, 41.3, 41.31, 41.57; 165/139, 154, 157, 159, 160, 164
See application file for complete search history.

(56) References Cited

U.S. PATENT DOCUMENTS

| | | | | |
|---|---|---|---|---|
| 4,236,492 A * | 12/1980 | Tholen | ...... | F01P 3/18 |
| | | | | 123/563 |
| 4,317,439 A * | 3/1982 | Emmerling | ...... | F01P 3/20 |
| | | | | 123/563 |
| 6,035,834 A * | 3/2000 | Packard | ...... | F02B 29/0468 |
| | | | | 123/25 A |
| 6,098,576 A * | 8/2000 | Nowak, Jr. | ...... | F01P 3/20 |
| | | | | 123/41.29 |
| 6,138,647 A * | 10/2000 | Packard | ...... | F02B 29/0468 |
| | | | | 123/25 A |
| 6,289,853 B1 * | 9/2001 | Walczak | ...... | F02B 61/045 |
| | | | | 123/25 C |
| 6,561,169 B2 * | 5/2003 | Sealy | ...... | F02B 27/02 |
| | | | | 123/559.1 |
| 6,688,292 B2 * | 2/2004 | Ruppel | ...... | F02B 29/0412 |
| | | | | 123/563 |
| 7,040,303 B2 * | 5/2006 | Uzkan | ...... | F01P 7/165 |
| | | | | 123/563 |
| 7,146,938 B2 * | 12/2006 | Sundholm | ...... | F02M 25/028 |
| | | | | 123/25 A |

(Continued)

*Primary Examiner* — Lindsay Low
*Assistant Examiner* — Grant Moubry

(57) ABSTRACT

A vehicle cooling system includes a fan, a radiator, a charge air cooler upstream of the radiator, an air conduit supplying air to the charge air cooler, and a cooler for cooling the charge air cooler or air flowing through the air conduit. The cooler includes a housing surrounding a portion of the air conduit, an injector for injecting water into a space between the cooler housing and the air conduit, an outlet pipe for conducting vaporized water out of the space, and a pump for pumping water from a source to the injector. The cooler also includes heat conducting vanes which extend into the space and into an interior of the air conduit.

10 Claims, 4 Drawing Sheets

(56) References Cited

U.S. PATENT DOCUMENTS

| | | | | |
|---|---|---|---|---|
| 7,225,762 | B2* | 6/2007 | Mahlanen | F02B 29/0406 123/25 B |
| 8,109,093 | B2* | 2/2012 | Hallback | F01N 3/05 123/25 J |
| 8,316,806 | B2* | 11/2012 | Soderberg | F01P 7/165 123/196 AB |
| 8,695,340 | B2* | 4/2014 | Kardos | 123/568.12 |
| 2007/0199320 | A1* | 8/2007 | Yager | F02B 29/0412 60/599 |
| 2010/0199664 | A1* | 8/2010 | Oberlechner | F01N 5/02 60/599 |

\* cited by examiner

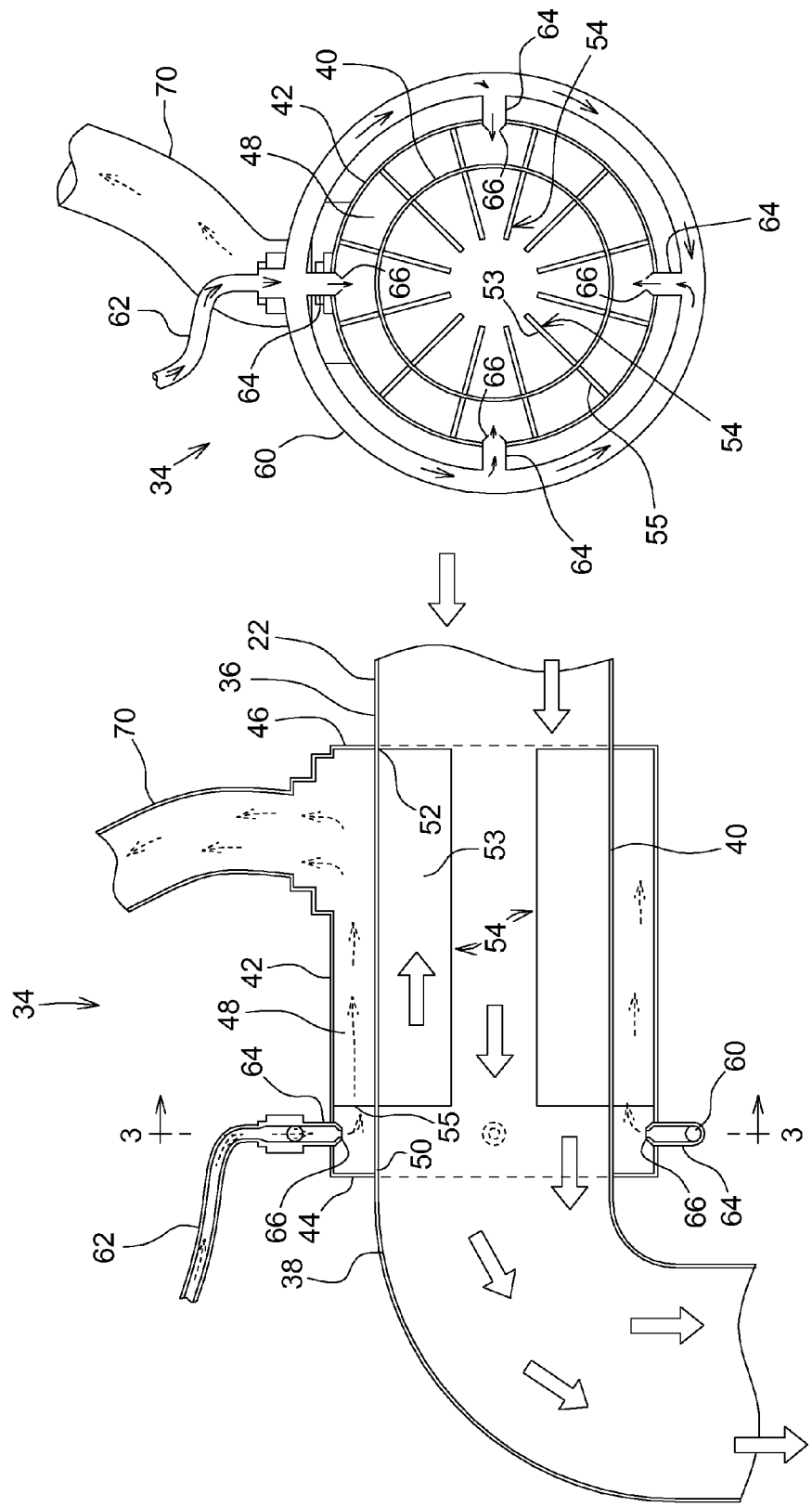

COOLING SYSTEM FOR CHARGE AIR COOLER

FIELD

The present disclosure relates to a cooling system for a motor vehicle, such as an agricultural tractor.

BACKGROUND

Operating a motor vehicle, such as an agricultural tractor, produces heat that must be rejected to the air through heat exchangers. A typical tractor cooling package will include a fan, a radiator, a charge air cooler, a hydraulic oil cooler, a condenser, and a fuel cooler in a stacked arrangement. There have been many front cooling package designs for tractors which seek to efficiently remove heat from the tractor. Typically, a fan pulls air through fluid filled heat exchangers. This fan is a major consumer of engine power. High charge air cooler inlet air temperatures in such a stacked arrangement heats up the radiator behind the charge air cooler. It is desired to provide a cooling system which cools the charge air cooler or the charge air which flows through the charge air cooler.

SUMMARY

According to an aspect of the present disclosure, a vehicle cooling system includes a fan, a radiator upstream of the fan, a charge air cooler upstream of the radiator, an air conduit connected to an air inlet of the charge air cooler, and a cooler for cooling the charge air cooler or air flowing through the air conduit. The cooler may include a cooler housing surrounding a portion of the air conduit, and an injector for injecting water into a space between the cooler housing and the air conduit, an outlet pipe for conducting vaporized water out of said space, and a pump for pumping water from a source to the injector.

According to another aspect of the present disclosure, the cooler may also include a plurality of heat conducting vanes which extend into the space and into an interior of the air conduit. The vanes conduct heat away from the charge air which flows through the air conduit. The cooler may be designed so that water and vaporized water flows over an outer surface of the air conduit in a first axial direction, and so that charge air flows through an interior of the air conduit in a second direction which is opposite to said first direction.

According to another aspect of the present disclosure, the cooler may also include a hollow inner sleeve inserted between an upstream portion of the air conduit and a downstream portion of the air conduit. A hollow outer sleeve surrounds the inner sleeve and forms an annular space therebetween. The heat conducting vanes extend into the annular space and into an interior of the inner sleeve.

According to another aspect of the present disclosure, the cooler also includes nozzles for injecting water into the annular space. An outlet pipe is connected to the outer sleeve, so that water vaporized in the annular space can flow through out of the annular space via the outlet pipe. A hollow ring-shaped conduit surrounds a portion of the outer sleeve. A supply line connects the ring-shaped conduit with an outlet of a pump. A plurality of spaced apart injector tubes communicate with the ring-shaped conduit. Each injector tube extends radially inwardly through the outer sleeve and forms a nozzle through which water from the ring-shaped conduit is injected into the annular space.

According to another aspect of the present disclosure, the cooler may include a spray conduit positioned adjacent to a portion of an upstream side of the charge air cooler. The spray conduit has a plurality of spray nozzles. A pump pumps water from a source to the spray conduit so that water sprays out of the spray nozzles and onto the upstream side of the charge air cooler. The spray conduit may form a loop with the spray nozzles positioned on interior surface of the loop.

According to another aspect of the present disclosure, the spray conduit may include a first branch line, a second branch line and a third branch line. The first and second branch lines may be connected together to form a loop, with the third branch line bisecting the loop.

BRIEF DESCRIPTION OF THE DRAWINGS

FIG. 2 is a sectional view of the injector portion of FIG. 1;

FIG. 3 is a view taken along lines 3-3 of FIG. 2;

DETAILED DESCRIPTION OF THE DRAWINGS

Figure 1:
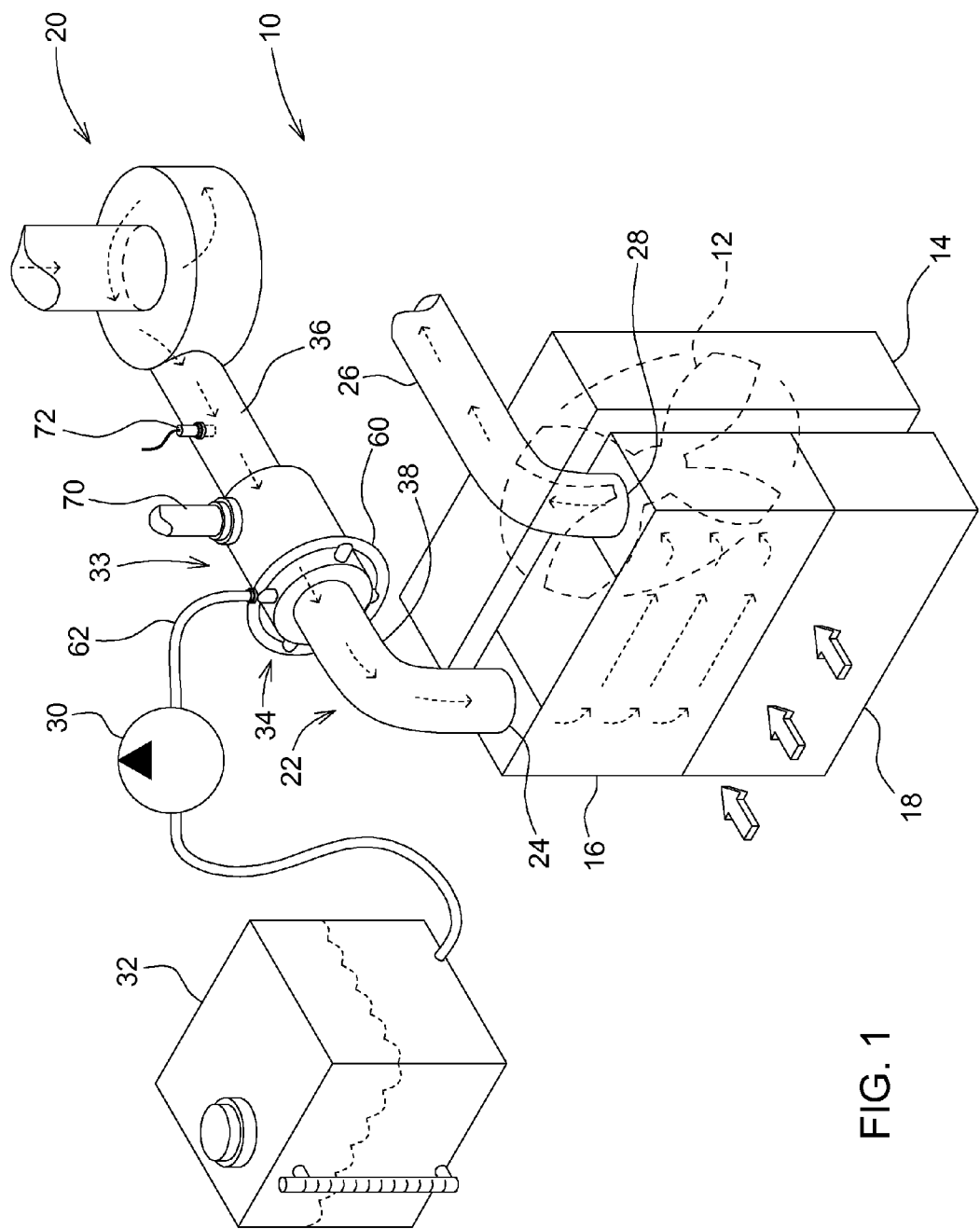
FIG. 1 is a schematic perspective view an embodiment of the invention.

Referring to FIG. 1, a vehicle cooling system 10 for an engine (not shown) includes a fan 12 and a radiator 14. The fan 12 pulls air from left to right into and through the radiator 14 and through the fan 12. A charge air cooler 16 is upstream of the radiator 14 and is also in the air flow path. A hydraulic oil cooler 18 may be upstream of the radiator 14 in the air flow path and is below and adjacent to the charge air cooler 16.

A turbocharger 20 generates a supply of charge air for the engine (not shown). A first air conduit 22 communicates charge air from the turbocharger 20 to an air inlet 24 of the charge air cooler 16. A second air conduit 26 communicates charge air from an outlet 28 of the charge air cooler 16 to an air intake (not shown) of the engine (not shown).

A water pump 30 pumps water from a water reservoir or tank 32 to a water injector 34 which is part of a cooler 33 which is placed between an upstream portion 36 and a downstream portion 38 of the first air conduit 22. Alcohol or a similar fluid may be added to the water in cold conditions to keep the system from freezing.

Referring now to FIGS. 1, 2 and 3, the water injector 34 includes a cylindrical heat conducting inner sleeve 40 and a cylindrical heat conducting outer sleeve 42 which surrounds and is spaced apart from the inner sleeve 40. Annular end walls 44 and 46 at opposite ends of the outer sleeve 42 extend between the outer sleeve 42 and the inner sleeve 40. The end walls 44 and 46, the outer sleeve 42 and the inner sleeve 40 enclose an annular space 48. An upstream end 50 of inner sleeve 40 is joined to an end of upstream portion 36 of the first air conduit 22. A downstream end 52 of inner sleeve 40 is joined to an end of downstream portion 38 of the first air conduit 22.

The injector 34 includes a plurality of spaced-apart heat conducting vanes 54. Each vane 54 extends radially inwardly from an inner surface of outer sleeve 42, through inner sleeve 40 and into the interior of sleeve 40. As a result, the vanes 54 have radially inner portions 53 which are exposed to the charge air which flows through inner sleeve 40, and radially outer portions 55 which extend between inner sleeve 40 and outer sleeve 42. The vanes 54 conduct heat radially outwardly from the charge air to their radially outer ends and to the outer sleeve 42.

The injector 34 also includes a hollow ring-shaped conduit 60 which surrounds a portion of the outer sleeve 42 near its upstream end. A supply line 62 connects the conduit 60 with an outlet of the pump 30. A plurality of spaced apart injector tubes 64 are in communication with the conduit 60. Each injector tube 64 extends radially inwardly through the outer sleeve 42 and forms a nozzle 66 through which water from conduit 60 is injected into the upstream end of annular space 48 between the outer portions 55 of adjacent pairs of the vanes 54, and between inner sleeve 40 and outer sleeve 42.

The injector 34 also includes a hollow outlet pipe 70 which is connected to a downstream end of outer sleeve 42 and is communicated with a downstream portion of annular space 48. As best seen in FIG. 2, the water injected by nozzles 66 can turn to steam which then flows out of the injector 34 via outlet pipe 70. Also as best seen in FIG. 2, the water and steam flow in a direction which is opposite to the flow direction of the charge air through the charge air conduit 22. The result is an injector 34 which extracts heat from the charge air flowing through the charge air conduit 22 and the charge air cooler 16.

The injector 34 utilizes the latent heat of water vaporization to cool the charge air and increase heat carrying capacity of the charge air leaving the turbocharger.

As water is injected via the small nozzles 66 near an end of the injector 34, the water will vaporize and expand greatly as steam. This steam can flow out of the injector 34 through the outlet pipe 70 so that water can continue to enter the confined space between inner sleeve 40 and outer sleeve 42. The downstream outlet pipe 70 allows the flow of water and steam to be continuous. The downstream outlet pipe 70 is sized bigger than the nozzles 66 because steam has less density and requires more outlet area than water to keep the pressure drop low. The outlet pipe 70 could be connected into the exhaust stream via a Venturi (not shown), where exhaust temperatures would be even higher than the vapor stream. These high exhaust temperatures keep water vapor from condensing.

Water injection could be controlled as a function of temperature sensed by temperature sensor 72 so that water would not be injected until it would be vaporized and until there is significant heat that can be carried away by water vaporization. At temperatures lower than the boiling point of water, the water would increase in temperature but it would not transport away as much heat as when it undergoes a phase change from liquid to gas.

Figure 4:
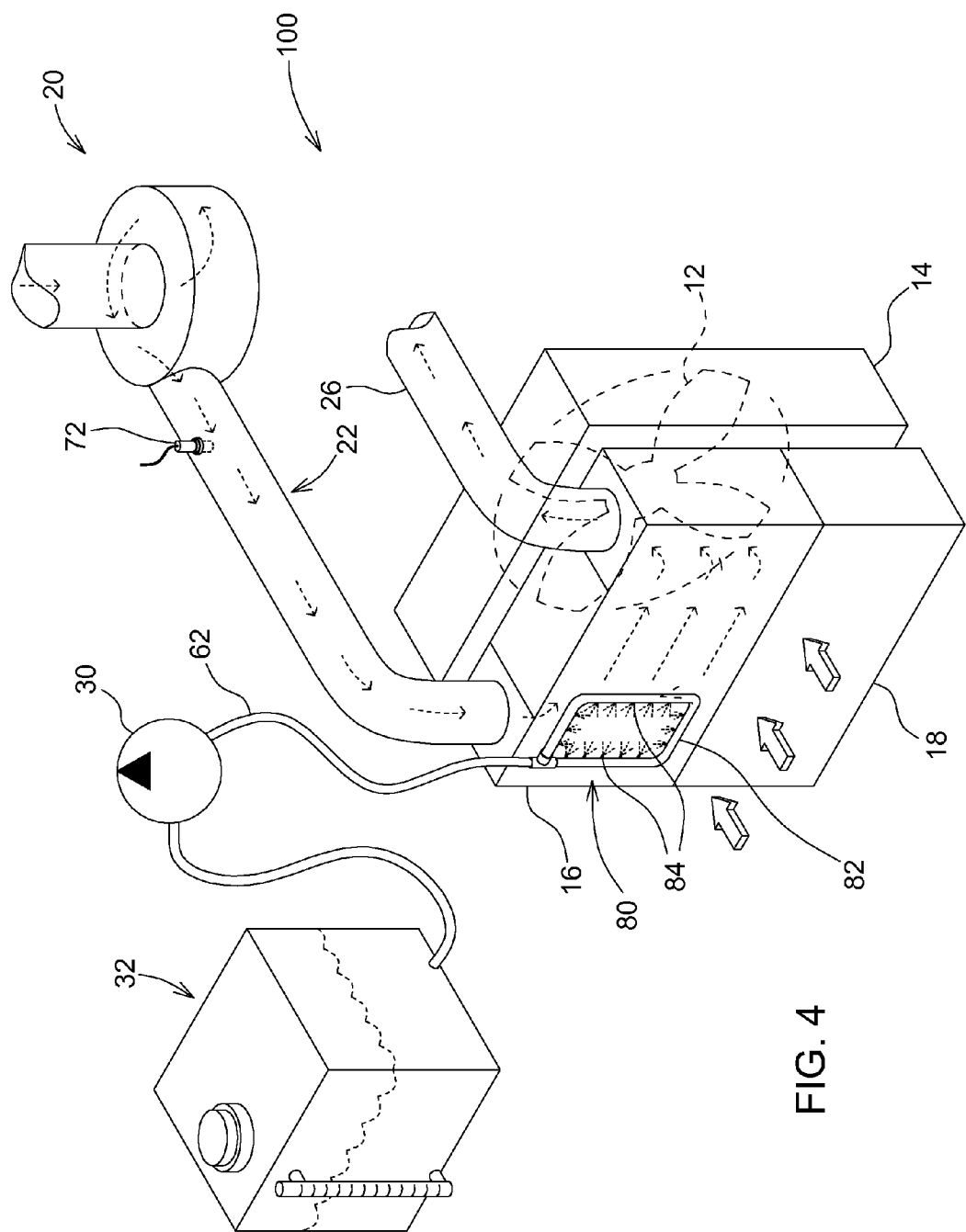
FIG. 4 is a schematic perspective view an alternate embodiment of the invention.
Figure 5:
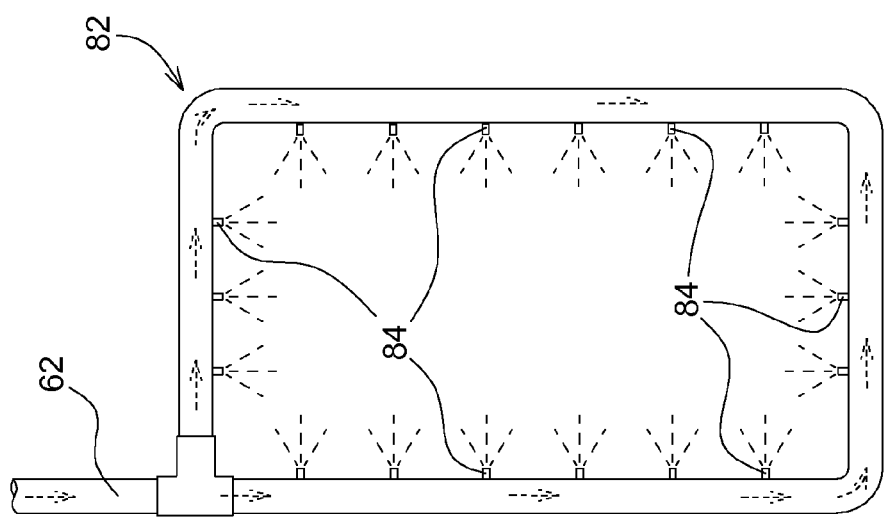
FIG. 5 is an enlarged view of the injector device of FIG. 4.

Referring now to FIGS. 4 and 5, a vehicle cooling system 100 is similar to the cooling system 10 of FIG. 1, and the same reference numbers are used. The cooling system 100 differs from the cooling system 10 in that the injector 34 is replaced by injector 80. Injector 80 includes a loop conduit 82 which is connected to the pump 30 by supply line 62. The loop conduit 82 has a plurality of spray nozzles 84 which are positioned on interior surfaces of the loop conduit 82.

Figure 6:
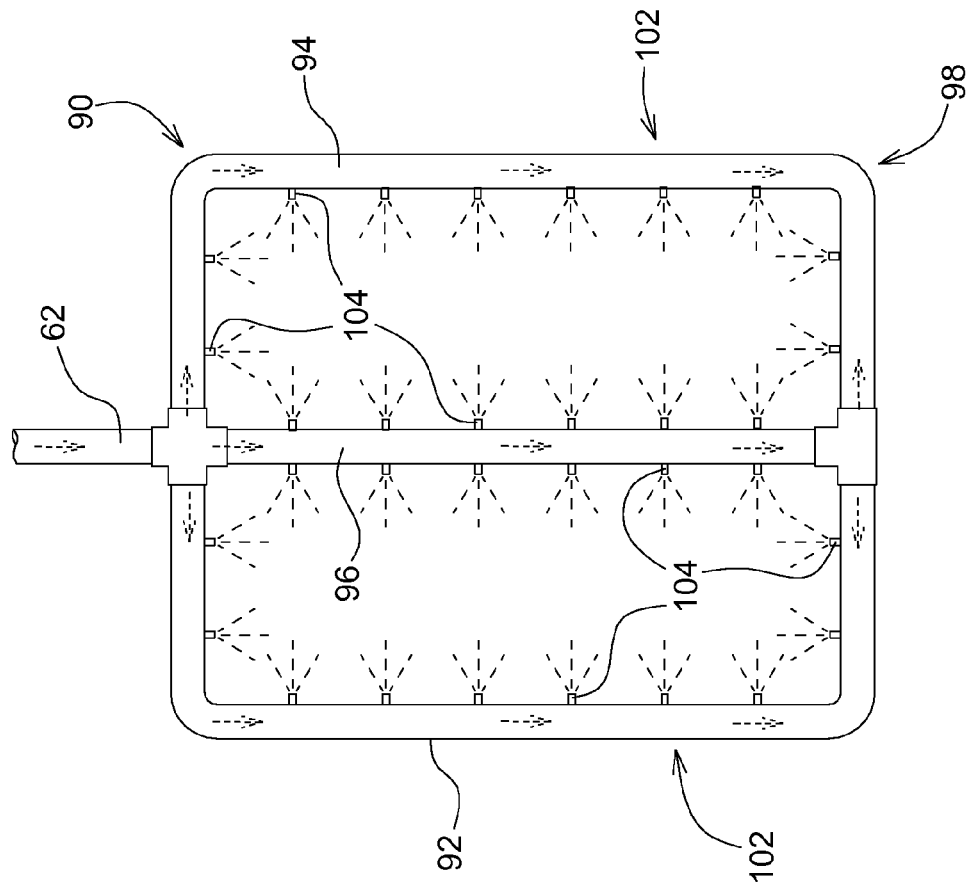
FIG. 6 is an enlarged view of an alternative to the injector device of FIG. 5.

Referring now to FIG. 6, an alternate injector 90 includes a first or left branch 92, a second or right branch 94 and a third or middle branch 96. The first and second branches 90, 92 form an outer loop 98 which is bisected by the third branch 96. Alternatively, these branches can be described as forming side-by-side loops 102. All the branches 92-96 have a plurality of spray nozzles 104. With respect to FIGS. 4-6, the pump 30 pumps water from the tank 32 to the injector 80 or 90 so that water sprays out of the spray nozzles 84 or 104 and onto the upstream side of the charge air cooler 16. This water contacts the heat exchange surfaces of the charge air cooler 16 as the fan pulls air and this water through the charge air cooler 16. The water absorbs heat from the charge air cooler 16 and further cools the charge air cooler 16.

The pump 30 could be controlled by a control unit (not shown) which could be programmed to determine incoming air moisture content, to monitor the internal inlet air temperature and flow of the charge air cooler. The control unit could use a model to determine how much water should be added by the injectors. The control unit could use a decision model to determine the benefit of water vaporization (tractor load, fan power savings, on-board water availability, load variability, etc).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A vehicle cooling system, comprising:
a fan;
a radiator upstream of the fan;
a charge air cooler upstream of the radiator;
an air conduit connected to an air inlet of the charge air cooler; and
a cooler for cooling the charge air cooler or air flowing through the air conduit, wherein:
the cooler comprises:
a hollow inner sleeve inserted between an upstream portion of the air conduit and a downstream portion of the air conduit;
a hollow outer sleeve which surrounds the inner sleeve and which forms an annular space therebetween;
a plurality of heat conducting vanes which extend into the annular space and into an interior of the inner sleeve, the vanes conducting heat away from charge air which flows through the inner sleeve;
at least one nozzle for injecting water into the annular space; and
an outlet pipe connected to the outer sleeve, so that water vaporized in the annular space can flow through and out of the annular space via the outlet pipe.

2. The cooling system of claim 1, wherein:
water and vaporized water flows over an outer surface of the air conduit in a first axial direction; and
charge air flows through an interior of the air conduit in a second direction which opposite to said first direction.

3. The cooling system of claim 1, wherein:
a hollow ring-shaped conduit surrounds a portion of the outer sleeve;
a supply line connects the ring-shaped conduit with an outlet of a pump; and
a plurality of spaced apart injector tubes are in communication with the ring-shaped conduit, each injector tube extending radially inwardly through the outer sleeve and forming a nozzle through which water from the ring-shaped conduit is injected into the annular space.

4. A vehicle cooling system, comprising:

a fan;

a radiator upstream of the fan;

a charge air cooler upstream of the radiator;

an air conduit connected to an air inlet of the charge air cooler; and a cooler for cooling the charge air cooler or air flowing through the air conduit, wherein:

the cooler comprises a spray conduit positioned adjacent to a portion of an upstream side of the charge air cooler, the spray conduit having a plurality of spray nozzles being outside of the air conduit; and a pump for pumping water from a source to the spray conduit so that water sprays out of the spray nozzles and onto said upstream side and outside of the charge air cooler.

5. The cooling system of claim 4, wherein:

the spray conduit comprises a first branch line, a second branch line and a third branch line, the first and second branch lines being connected together to form a loop and the third branch line bisecting said loop.

6. A vehicle cooling system, comprising:

a fan;

a radiator upstream of the fan;

a charge air cooler upstream of the radiator;

an air conduit connected to an air inlet of the charge air cooler; and a cooler for cooling the charge air cooler or air flowing through the air conduit, wherein:

the cooler comprises a spray conduit forming a loop positioned adjacent to a portion of an upstream side of the charge air cooler, the spray conduit having a plurality of spray nozzles; and a pump for pumping water from a source to the spray conduit so that water sprays out of the spray nozzles and onto said upstream side of the charge air cooler.

7. The cooling system of claim 6, wherein:

the spray nozzles are positioned on an interior surface of the loop.

8. A vehicle cooling system, comprising:

a fan;

a radiator upstream of the fan;

a charge air cooler upstream of the radiator;

an air conduit connected to an air inlet of the charge air cooler; and a cooler comprising:

a cooler housing surrounding a portion of the air conduit;

an injector for injecting water into a space between the cooler housing and the air conduit;

an outlet pipe for conducting vaporized water out of said space; and a pump for pumping water from a source to the injector;

a hollow inner sleeve inserted between an upstream portion of the air conduit and a downstream portion of the air conduit;

a hollow outer sleeve which surrounds the inner sleeve and which forms an annular space therebetween; and a plurality of heat conducting vanes which extend into the annular space and into an interior of the inner sleeve, the vanes conducting heat away from charge air which flows through the inner sleeve, the injector comprises at least one nozzle for injecting water into the annular space, and the outlet pipe being connected to the outer sleeve, so that water vaporized in the annular space can flow out of the annular space via the outlet pipe.

9. The cooling system of claim 8, wherein:

water and vaporized water flows over an outer surface of the air conduit in a first axial direction; and charge air flows through an interior of the air conduit in a second direction which opposite to said first direction.

10. The cooling system of claim 8, wherein:

a hollow ring-shaped conduit surrounds a portion of the outer sleeve;

a supply line connects the ring-shaped conduit with an outlet of a pump; and a plurality of spaced apart injector tubes are in communication with the ring-shaped conduit, each injector tube extending radially inwardly through the outer sleeve and forming a nozzle through which water from the ring-shaped conduit is injected into the annular space.

* * * * *